No. 66,888.

G. ROBINSON.
PISTON PACKING.

PATENTED JULY 16, 1867.

Witnesses:
Theo Fuche
J. A. Service

Inventor:
George Robinson
Per Munn & Co
Attnys

United States Patent Office.

GEORGE ROBINSON, OF DETROIT, MICHIGAN.

Letters Patent No. 66,888, dated July 16, 1867.

---

IMPROVEMENT IN PISTON PACKING.

---

*The Schedule referred to in these Letters Patent and making part of the same.*

---

TO ALL WHOM IT MAY CONCERN:

Be it known that I, GEORGE ROBINSON, of Detroit, in the county of Wayne, and State of Michigan, have invented a new and useful Improvement in Piston Packing; and I do hereby declare that the following is a full, clear, and exact description thereof, which will enable others skilled in the art to make and use the same, reference being had to the accompanying drawings, forming part of this specification.

This invention relates to a new and improved method of packing the pistons of steam engines; and it consists in employing three packing-rings for that purpose, which are forced outward against the cylinder by the pressure of the steam in the cylinder, as will be hereinafter more fully described.

Similar letters of reference indicate like parts.

Figure 3:
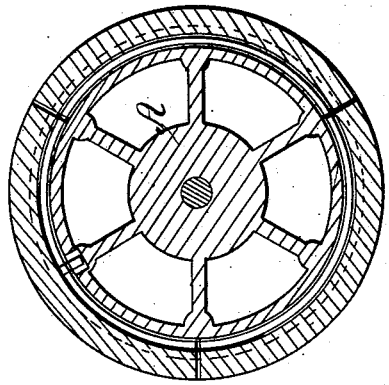
Figure 3 is a horizontal section of the piston through the line $y\ y$ of fig. 2.
Figure 1:
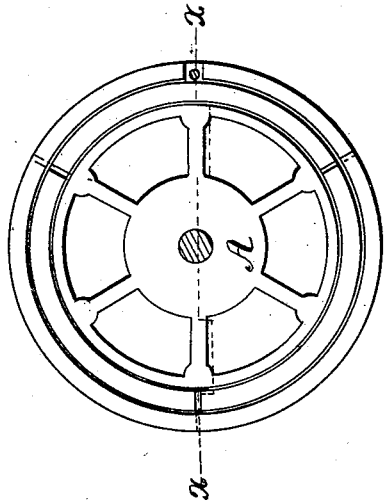
Figure 1 represents a top view of the piston with the follower off, showing the spider and the rings.
Figure 2:
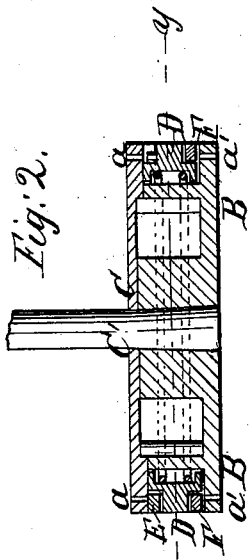
Figure 2 is a vertical section of fig. 1 through the line $x\ x$.

A is the piston-spider. B is the piston. C is the follower. The follower is placed on the piston so that a recess is formed for the packing-rings, as seen in the drawing. D is the central packing-ring. E is a packing-ring under the follower; and F is a packing-ring of the same kind and form upon the opposite side. $a\ a\ a'\ a'$ are holes, through which the steam passes to press out the rings. The follower C is screwed down on to the spider tightly, leaving the recess for the rings large enough to allow them to play as they are expanded, and sufficiently loose for the steam to have access behind them. Back of the central packing-ring D there are small springs, which are for the purpose of holding the rings in place when the steam is shut off. When steam is admitted into the cylinder on the spider side, as at $a'$, the rings will be pressed against the follower, thus closing the holes $a$ through the follower. The steam then passes to the inside of the ring D, which presses all the rings outward. The same operation takes place when the steam is admitted through the follower. In that case the holes $a'$ through the spider will be closed, and so on alternately for every stroke of the piston.

All the packing-rings are cut in one or more pieces, so as to allow them to be evenly adjusted to the cylinder by the pressure.

Having thus described my invention, what I claim as new, and desire to secure by Letters Patent, is—

The packing-ring D, constructed as described, in combination with the rings E and F, arranged so as to close the holes $a\ a'$ alternately, the steam passing beneath the ring D, pressing it out, as herein set forth for the purpose specified.

GEORGE ROBINSON.

Witnesses:
  EUGENE FECHT,
  RUSSELL MARVIN.